United States Patent
Tomar et al.

(10) Patent No.: US 11,948,120 B2
(45) Date of Patent: Apr. 2, 2024

(54) SYSTEMS AND METHODS OF MERGING RETAIL PRODUCTS BETWEEN CONTAINERS TO OPTIMIZE STORING CAPACITY OF RETAIL STORAGE FACILITIES

(71) Applicant: Walmart Apollo, LLC, Bentonville, AR (US)

(72) Inventors: Vivek Tomar, Cincinnati, OH (US); Rei E. Siew Hew Sam, New York, NY (US); Sunada S N Chakravarthy, Metuchen, NJ (US); Kaiwen Luo, Atlanta, GA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/101,493

(22) Filed: Jan. 25, 2023

(65) Prior Publication Data

US 2023/0245034 A1    Aug. 3, 2023

Related U.S. Application Data

(60) Provisional application No. 63/304,908, filed on Jan. 31, 2022.

(51) Int. Cl.
  *G06Q 10/08*   (2023.01)
  *B65G 1/137*   (2006.01)

(52) U.S. Cl.
  CPC .......... *G06Q 10/08* (2013.01); *B65G 1/1373* (2013.01)

(58) Field of Classification Search
  CPC .. G06Q 10/08; G06Q 10/087; G06Q 10/0875; B65G 1/1373
  See application file for complete search history.

(56) References Cited

U.S. PATENT DOCUMENTS

| 6,688,459 B1 * | 2/2004 | Bonham ................ B65G 47/82 |
| | | 209/916 |
| 8,234,006 B1 | 7/2012 | Sachar |

(Continued)

FOREIGN PATENT DOCUMENTS

| WO | 2001027567 | 9/2001 |
| WO | 2020185081 | 9/2020 |

(Continued)

OTHER PUBLICATIONS

Geeksforgeeks; "Bin Packing Problem (Minimize No. of used Bins)"; < https://www.geeksforgeeks.org/bin-packing-problem-minimize-number-of-used-bins/>; Jul. 28, 2021; pp. 1-17.

(Continued)

*Primary Examiner* — Michael Jared Walker
(74) *Attorney, Agent, or Firm* — Fitch, Even, Tabin & Flannery, LLP

(57) ABSTRACT

Automated storage and retrieval systems for managing storage of inventory at a retail facility include a storage structure with storage locations configured to store containers that contain retail products, and a conveying system that conveys the containers between the storage locations and a product picking station. A processor-based control circuit analyzes one or more business rules governing product merging between the containers being conveyed toward the picking station by the conveying system to identify two containers that are eligible for the product merging therebetween. When the control circuit detects that the two containers identified as product merging eligible arrived at the picking station, these two containers are kept by the conveying system at the picking station until all of the products are removed from a first one of these two containers and merged together with the products stored in a second one of these two containers.

20 Claims, 4 Drawing Sheets

(56) References Cited

U.S. PATENT DOCUMENTS

| | | | |
|---|---|---|---|
| 9,460,524 B1 | 10/2016 | Curlander | |
| 10,138,062 B2* | 11/2018 | High | B25J 9/0093 |
| 10,246,275 B1* | 4/2019 | Lehmann | B65B 59/001 |
| 10,339,491 B2* | 7/2019 | Wakim | G06Q 10/0836 |
| 10,769,579 B1* | 9/2020 | Smith | B65G 1/1375 |
| 11,001,438 B2* | 5/2021 | Eisenman | B65D 90/48 |
| 11,003,804 B2* | 5/2021 | Krishnamurthy | G06Q 10/08 |
| 11,049,086 B2* | 6/2021 | Brooks | G06Q 20/203 |
| 11,074,547 B2* | 7/2021 | Rajkhowa | G06Q 10/04 |
| 11,142,402 B2* | 10/2021 | Lert, Jr. | G06Q 30/0643 |
| 2017/0043953 A1* | 2/2017 | Battles | B65G 1/04 |
| 2018/0194556 A1* | 7/2018 | Lert, Jr. | B65G 1/1378 |
| 2018/0247257 A1* | 8/2018 | Lert, Jr. | H04W 4/35 |
| 2018/0374046 A1* | 12/2018 | Powers | G06Q 10/08345 |
| 2019/0233213 A1* | 8/2019 | Phan-Quiroga | B65G 1/0492 |
| 2019/0276176 A1* | 9/2019 | Almogy | B65B 5/101 |
| 2019/0322454 A1* | 10/2019 | Wan | B65G 1/1378 |
| 2019/0389659 A1* | 12/2019 | Grinnell | B65G 1/1373 |
| 2020/0039668 A1* | 2/2020 | Que | B65B 5/10 |
| 2020/0087010 A1 | 3/2020 | Almogy | |
| 2020/0167727 A1* | 5/2020 | Ikeda | G06Q 10/087 |
| 2020/0306973 A1* | 10/2020 | Edwards | B65G 1/1373 |
| 2020/0379440 A1* | 12/2020 | Ziegler | G06Q 10/087 |
| 2021/0103886 A1* | 4/2021 | Sezaki | B65G 1/137 |
| 2021/0149382 A1* | 5/2021 | Stadie | B60L 58/12 |
| 2021/0221619 A1 | 7/2021 | Lert, Jr. | |
| 2021/0241209 A1* | 8/2021 | Kim | G06Q 10/047 |
| 2021/0256460 A1* | 8/2021 | Kim | G06K 7/1413 |
| 2023/0245059 A1 | 8/2023 | Tomar | |
| 2023/0281556 A1 | 9/2023 | Chakravarthy | |
| 2023/0281557 A1 | 9/2023 | Tomar | |

FOREIGN PATENT DOCUMENTS

| | | |
|---|---|---|
| WO | 2021239559 A1 | 12/2021 |
| WO | 2021243059 A1 | 12/2021 |
| WO | 2023146940 | 8/2023 |
| WO | 2023146942 | 8/2023 |
| WO | 2023146950 | 8/2023 |
| WO | 2023146953 | 8/2023 |

OTHER PUBLICATIONS

Van Aken, Margo; "An efficient bin-packing algorithm for packing groceries in a fulfillment center"; <https://repository.tudelft.nl/islandora/object/uuid%3Af4ee26b5-b94e-4cd3-9c7a-c281b0c8d8a8>; Mar. 8, 2019; 85 pages.

U.S. Appl. No. 18/101,771, filed Jan. 26, 2023, Sunada Chakravarthy.

U.S. Appl. No. 18/101,780, filed Jan. 26, 2023, Vivek Tomar.

U.S. Appl. No. 18/101,791, filed Jan. 26, 2023, Vivek Tomar.

PCT; PCT/US23/11588; International Search Report and Written Opinion dated Apr. 17, 2023; 12 pages.

* cited by examiner

SYSTEMS AND METHODS OF MERGING RETAIL PRODUCTS BETWEEN CONTAINERS TO OPTIMIZE STORING CAPACITY OF RETAIL STORAGE FACILITIES

CROSS-REFERENCE TO RELATED APPLICATION

This application claims the benefit of U.S. Provisional Application No. 63/304,908, filed Jan. 31, 2022, which is incorporated herein by reference in its entirety.

TECHNICAL FIELD

This invention relates generally to managing product inventory and, in particular, to systems and methods for merging products between storage containers via automated systems.

BACKGROUND

Consumers often place product orders over the internet from large retailers of consumer products. Such product orders are typically fulfilled at distribution centers of the retailer. Generally, at a distribution center, products move on a conveyor and are placed into storage containers/totes based on their intended destination(s). A disadvantage of such systems is that the products are not placed into the storage containers in a way that optimally uses the interior space of the storage containers/totes, resulting in many storage containers/totes being less than full when they leave the distribution center, which in turn requires the use of more delivery vehicles to transport the storage containers/totes from the distribution center. As such, a typical large distribution center may utilize thousands of storage containers/totes per year that would not have been necessary if the products were packed into the storage containers/totes more efficiently. This increases the cost of operation for both the distribution center and the product transport services.

BRIEF DESCRIPTION OF THE DRAWINGS

Disclosed herein are embodiments of systems, apparatuses and methods pertaining to managing automated storage, retrieval, and merging of products at a product distribution facility. This description includes drawings, wherein.

Figure 1:
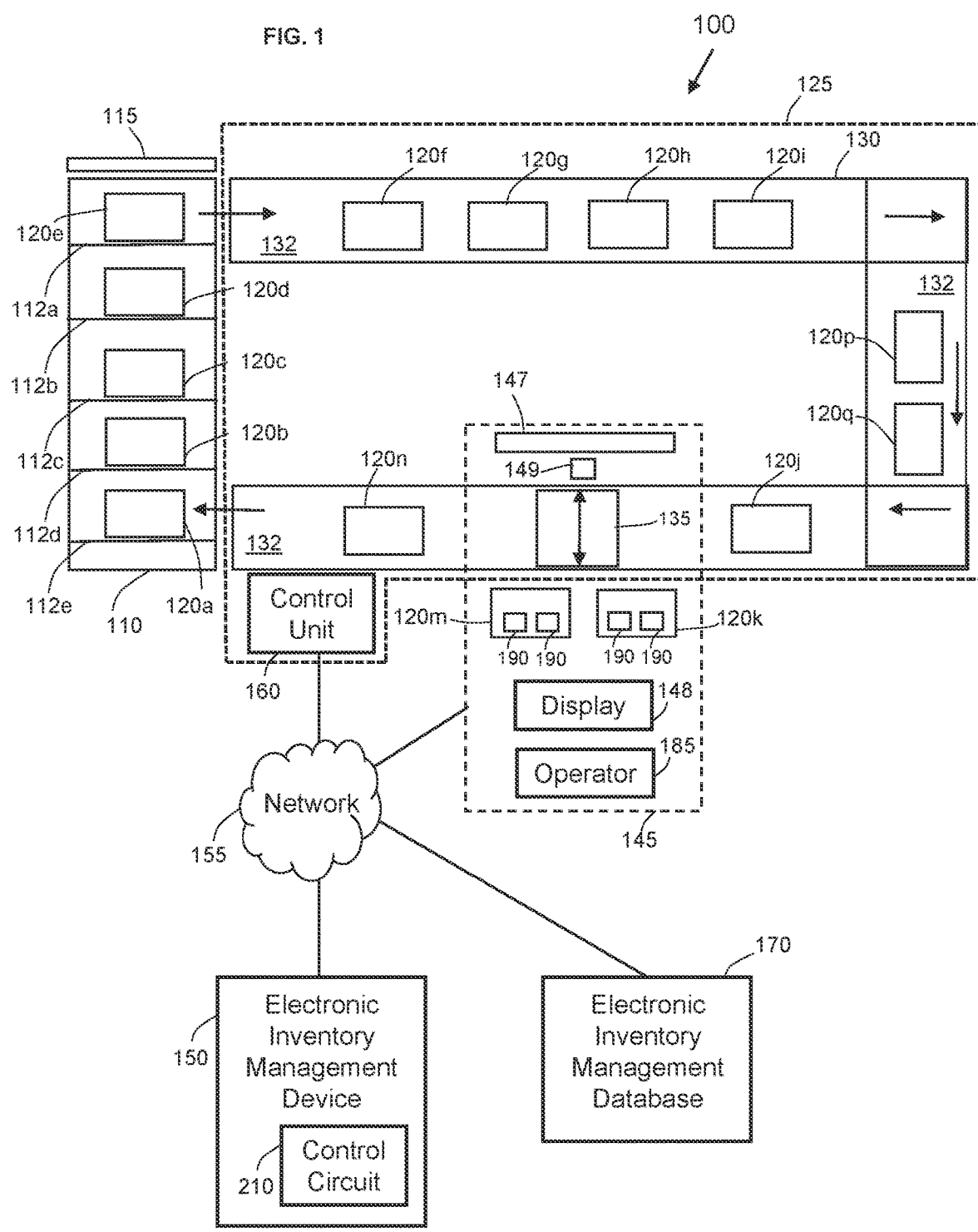
FIG. 1 is a diagram of a system of managing automated storage, retrieval, and merging of products at a product distribution facility in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, this disclosure relates to an automated storage and retrieval system for managing storage of inventory at a retail facility. The system includes a storage structure with storage locations configured to store containers that contain retail products, and a conveying system that conveys the containers between the storage locations and a product picking station. A processor-based control circuit analyzes one or more business rules governing product merging between the containers being conveyed toward the picking station by the conveying system to identify two containers that are eligible for the product merging therebetween. When the control circuit detects that the two containers identified as product merging eligible arrived at the picking station, these two containers are kept by the conveying system at the picking station until all of the products are removed from a first one of these two containers and merged together with the products stored in a second one of these two containers.

In some embodiments, an automated storage and retrieval system for managing storage of inventory at a retail facility includes: a storage structure including a plurality of storage locations configured to store a plurality of containers, each of the containers containing a plurality of products; a container transport system configured to transport the containers between the storage locations and at least one picking station, where one or more products are removed from one or more of the containers; a control unit operatively coupled to the container transport system and configured to control movement of the container transport system; and a control circuit communicatively coupled to the control unit. The control circuit is configured to analyze at least one business rule governing product merging between the containers being transported toward the at least one picking station by the container transport system to identify two adjacent containers that are eligible for the product merging therebetween. The control circuit is also configured, upon detection that the two adjacent containers identified as being eligible for the product merging arrived at the at least one picking station, to transmit a first signal to the control unit to cause the container transport system to keep the two adjacent containers that are eligible for the product merging at the at least one picking station until all of the products stored in a first one of the two adjacent containers are removed from the first one of the two adjacent containers and merged with the products stored in a second one of the two adjacent containers.

In some embodiments, a method of using an automated storage and retrieval system for managing storage of inventory at a retail facility includes analyzing, by a control circuit of the automated storage and retrieval system, at least one business rule governing product merging between containers being transported between a plurality of storage locations of a storage structure toward at least one picking station to identify two adjacent containers that are eligible for the product merging therebetween. The plurality of storage locations are configured to store a plurality of the containers, each of the containers containing a plurality of products. A container transport system is configured to convey the containers between the storage locations and the at least one picking station, where one or more products are removed from one or more of the containers. A control unit is operatively coupled to the container transport system and configured to control movement of the container transport system. The method further includes, upon detection that the two adjacent containers identified as being eligible for the product merging arrived at the at least one picking station, transmitting, by the control circuit, a first signal to the control unit to cause the container transport system to keep the two adjacent containers that are eligible for the product merging at the at least one picking station until all of the products stored in a first one of the two adjacent containers are removed from the first one of the two adjacent containers and merged with the products stored in a second one of the two adjacent containers.

FIG. 1 shows an embodiment of an automated storage and retrieval system 100 for managing storage of inventory at a retail facility. The retail facility may be any entity operating as a brick-and-mortar physical location (e.g., a store, product distribution center, storage warehouse, etc.) and/or a website accessible via the internet by way of which products 190 may be purchased by a consumer. A consumer may be an individual or a business entity. Exemplary products 190 that may be ordered by the consumers from the retailer via the system 100 may include, but are not limited to, general-purpose consumer goods, as well as consumable products, such as grocery products and/or other food items, medications, and dietary supplements.

The exemplary automated storage and retrieval system 100 shown in FIG. 1 includes a storage structure 110 including a plurality of storage locations 112a-112e configured to store a plurality of containers (also referred to as totes) 120a-120, each containing one or more products 190. Notably, while the storage locations 112a-112e (e.g., storage shelves) have been shown in FIG. 1 as each storing one container 120a-120e thereon, it will be appreciated that each of the storage locations 112a-112e may store two or more storage containers 120 thereon.

In the exemplary system 100 of FIG. 1, the storage structure 110 is operatively coupled to a container transport system 125 configured to transport the containers 120a-120q in the directions indicated by the arrows in FIG. 1 to/from the storage locations 112a-e of the storage structure 110 and to/from at least one picking station 145, where one or more products 190 may be removed from one or more of the containers 120a-120q, for example, for picking products 190 to fulfill existing customer orders and/or for merging (i.e., consolidating) the products 190 between the containers 120a-120q to optimize the storing capacity of the storage containers 120a-120q. In some embodiments, the container transport system 125 comprises a conveying system including at least a main conveyor 130 configured to convey the containers 120a-120q in the directions indicated by the arrows in FIG. 1 to/from the storage locations 112a-e of the storage structure 110 and to/from at least one picking station 145. In some embodiments, the container transport system 125 can include non-conveyor-based mechanisms to transport the containers.

The exemplary automated storage and retrieval system 100 shown in FIG. 1 includes one generally U-shaped main conveyor 130, but it will be appreciated that the system 100 may include a differently-shaped main conveyor 130 and/or two or more main conveyors 130, depending on the size of the automated storage and retrieval system and/or the retail facility. By the same token, while the main conveyor 130 is illustrated in FIG. 1 as having 10 product storage containers 120d-120p thereon, it will be appreciated that the main conveyor 130, depending on its shape and size, may concurrently transport less storage containers 120 thereon, or significantly more storage containers 120 thereon. Further, while only the containers 120k and 120m are shown in FIG. 1 as having products 190 stored therein, it will be appreciated that each of the containers 120a-120q may contain any number (e.g., dozens and/or hundreds) of products 190 therein, depending on the size of the containers 120a-120q and the products 190. Further, the shape and size of the containers 120a-120q and the products 190 in FIG. 1 has been shown by way of example only, and it will be appreciated that the containers 120a-120q and the products 190 may have various shapes and sizes.

In the exemplary system 100 of FIG. 1, the main conveyor 130 (also referred to herein as "the conveyor 130 or "the conveying system 130") has a product advancement surface 132 configured to move one or more products containers 120a-120q in one or more directions indicated by the arrows. The product advancement surface 132 of the conveyor 130 may be comprised of a single conveyor belt surface, or may be instead comprised of a series of two or more independently movable conveyor belt surfaces (e.g., FIG. 1 shows a conveyor belt surface 132 having three independently movable conveyor below surfaces, with the direction of movement of each one of the independent conveyor belt surfaces being shown by a directional arrow.

In some aspects, one or more of the independently movable conveyor surfaces of the product advancement surface 132 of the conveyor 130 may be configured to stop, while one or more of the other independently movable conveyor sections of the product advancement surface 132 are permitted to move. The conveyor 130 may be a belt conveyor, chain conveyor, or the like, and may have a continuous, uninterrupted product advancement surface 132, or may have a product advancement surface 132 that includes one or more interruptions at the transitions between the distinct, independently movable conveyor surfaces.

The system 100 depicted in FIG. 1 includes a control unit 160 operatively coupled to the conveyor 130 and configured to control movement of the conveyor 130 via one or more control signals. In some aspects, the control unit 160 is configured to start or stop the movement of the conveyor 130 (or one or more independently movable product advancement surfaces 132 of the conveyor 130) in response to one or more control signals sent from an electronic inventory management device 150 (also referred to herein as a computing device) of the system 100, which will be described in more detail below.

The electronic inventory management device 150 of the exemplary system 100 may be located at the retail facility or remotely relative to the retail facility, and may be a stationary or portable electronic device, for example, a desktop computer, a laptop computer, a tablet, a mobile phone, or any other electronic device including a processor-based control circuit (i.e., control unit). In the embodiment of FIG. 1, the electronic inventory management device 150 is configured for data entry and processing as well as for communication with other devices of system 100 via the network 155. The exemplary network 155 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like.

In some embodiments, the system 100 includes one or more localized Internet-of-Things (IoT) devices and controllers in communication with the electronic inventory management device 150. As a result, in some embodiments, the localized IoT devices and controllers can perform most, if not all, of the computational load and associated monitoring that would otherwise be performed by the electronic inventory management device 150, and then later asynchronous uploading of summary data can be performed by a designated one of the IoT devices to the electronic inventory management device 150, or a server remote to the electronic inventory management device 150. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the electronic inventory management device 150 or a server remote to the electronic inventory management device 150.

In the embodiment of FIG. 1, the system 100 further includes picking stations 145 (only one is shown in FIG. 1 for simplicity) configured to permit a robotic arm 147 or a human operator 185 (e.g., a human worker assigned to work at the automated storage and retrieval system 100) to pick one or more products 190 from one or more of the storage containers 120a-120q and to, for example, merge the products 190 picked from one of the storage containers (e.g., 120k) into another one of the storage containers (e.g., 120m) to optimize the storage space of the container 120m and to free up storage space of the container 120k.

Notably, in some embodiments, the picking station 145 may include a movable robotic arm 147 that is positioned and configured to grasp one or more of the products 190 from one or more of the containers 120k, 120m positioned at the picking station 145, and to transfer such products between the containers 120k, 120m positioned at the picking station 145. In certain implementations, the control unit 160 is configured to control the movement of the robotic arm 147 via one or more control signals. For example, the control unit 160 may control the start, stop, and direction of movement of the robotic arm 147 in response to one or more control signals sent from the electronic inventory management device 150. In some embodiment, the robotic arm 147 may not be controlled via the control unit 160, but may be operatively coupled to a separate control unit that is configured to control movement of the robotic arm 147 in response to one or more control signals sent from the electronic inventory management device 150.

Notably, in the system 100 of FIG. 1, the storage structure 110 includes a movable robotic arm 115 that is positioned to have access to the storage locations 112a-112e, and configured to grasp one or more of the containers 120a-120e positioned on the storage locations 112a-112e, and to transfer such containers 120a-120e from the storage structure 110 to the main conveyor 130. In certain implementations, the control unit 160 is configured to control the movement of the robotic arm 115 via one or more control signals. For example, the control unit 160 may control the start, stop, and direction of movement of the robotic arm 115 in response to one or more control signals sent from then electronic inventory management device 150. In some embodiment, the robotic arm 115 may not be controlled via the control unit 160, but may be operatively coupled to a separate control unit that is configured to control movement of the robotic arm 115 in response to one or more control signals sent from the electronic inventory management device 150.

In the exemplary system 100 depicted in FIG. 1, the picking station 145 includes one or more sensors 149 that are positioned and configured to detect each of the products 190 picked from, placed into, and/or otherwise transferred between the containers 120k, 120m by the operator 185 and/or by the robotic arm 147 at the picking station 145. One or more sensors 149 suitable for use to detect the number of products 190 picked from, placed into, and/or transferred between the containers 120k, 120m at the picking station 145 may include but is not limited to one or more of: a video camera, motion sensor, infrared sensor, bar code sensor, radio-frequency identification (RFID) sensor, laser sensor, or the like.

In the exemplary embodiment shown in FIG. 1, the picking station 145 includes a display 148 (which may be a stand-alone display or a computing device with a display (e.g., a laptop, tablet, or the like)). In some embodiments, the control circuit 210 of the electronic inventory management device 150 may send a signal to the display 148 to cause the display 148 to depict a visual and/or audible notification to the operator 185 at the at least one picking station 145. An exemplary notification that may be displayed on the display 148 in response to a signal sent by the control circuit 210 may include a notification identifying the two adjacent containers eligible for the product merging (e.g., 120k and 120m) and indicating which of the two adjacent containers (i.e., 120k or 120m) is to be emptied (by the operator 185 and/or robotic arm 147), and which of the two adjacent containers 120k, 120m is to be filled with the products 190 removed from the container 120k, 120m that is emptied. In some embodiments, instead of sending a notification to the operator 185 via the display 148, the control circuit 210 may send a signal including a container merging notification/instruction via the network 155 to a computing device (e.g., a hand-held phone, tablet, laptop, etc.) of the operator 185.

Figure 2:
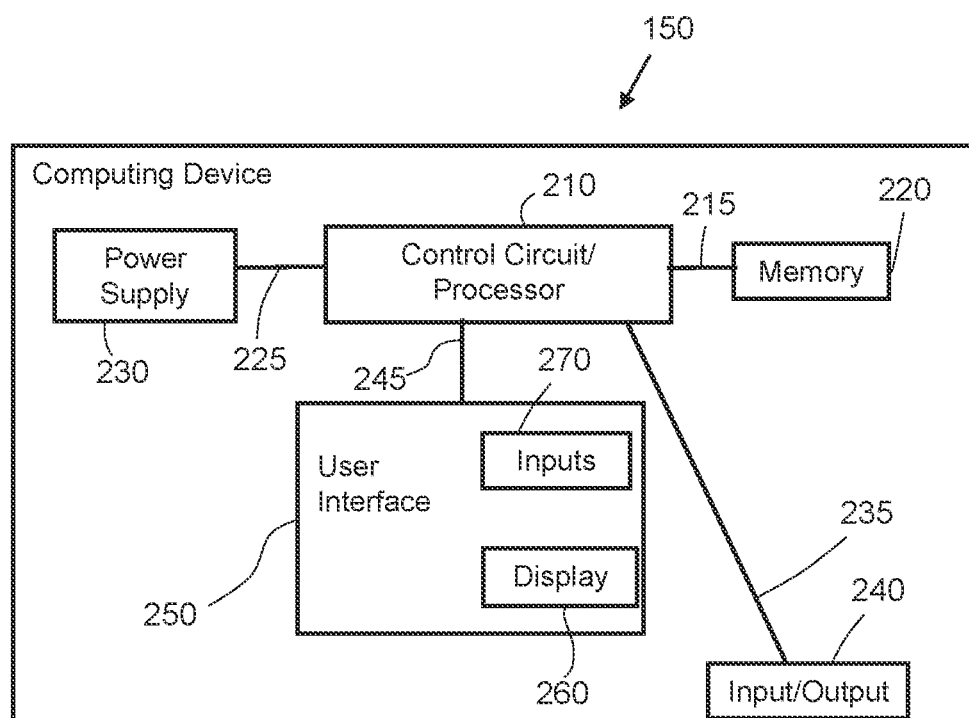
FIG. 2 is a functional diagram of a computing device in accordance with several embodiments.

With reference to FIG. 2, an exemplary electronic inventory management device 150 configured for use with exemplary systems and methods described herein may include a control circuit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control circuit 210 may be referred to as a non-transitory medium or non-transitory computer readable medium.

The control circuit 210 of the electronic inventory management device 150 is also electrically coupled via a connection 235 to an input/output 240 that can receive signals from any of the other electronic components of the system 100 (e.g., control unit 160, sensor 149, electronic database 170), or from any other source (a regional central server, a hand-held device of a worker, etc.) that can communicate with the electronic inventory management device 150 via a wired or wireless connection. The input/output 240 can also send signals to the display 148, control unit 160, and electronic database 170 (shown in FIG. 1), or to any other device in wired or wireless communication with the electronic inventory management device 150.

In the embodiment shown in FIG. 2, the processor-based control circuit 210 of the electronic inventory management (or computing) device 150 is electrically coupled via a connection 245 to a user interface 250, which may include a visual display or display screen 260 (e.g., light-emitting diode (LED) screen) and/or button input 270 that provide the user interface 250 with the ability to permit an operator of the electronic inventory management device 150 to manually control the electronic inventory management device 150 by inputting commands via touch-screen and/or button operation and/or voice commands to, for example, set one or more product picking rules and/or container merging rules with respect to the containers 120a-120q and/or products 190 processed by the automated storage and retrieval system 100. It will be appreciated that the performance of such functions by the processor-based control circuit 210 of the electronic inventory management device 150 is not dependent on a human operator, and that the control circuit 210 may be programmed to perform such functions without a human operator.

In some embodiments, the display 260 of the electronic inventory management device 150 is configured to display various graphical interface-based menus, options, and/or alerts that may be transmitted from the electronic inventory management device 150 to, for example, the display 148, the control unit 160, or the like, in connection with various aspects of picking the products 190 from the containers 120a-120q and/or merging the products 190 between the containers 120a-120q. The inputs 270 of the electronic inventory management device 150 may be configured to permit an operator to navigate through the on-screen menus on the electronic inventory management device 150 and make changes and/or updates to, for example, the product merging business rules. It will be appreciated that the display screen 260 may be configured as both a display screen and an input 270 (e.g., a touch-screen that permits an operator to press on the display screen 260 to enter text and/or execute commands.)

In some embodiments, as the product-containing containers 120f-120q are traveling on the conveyor 130, the control circuit 210 of the electronic inventory management device 150 is programmed to analyze at least one business rule governing product merging between the containers 120f-120q being conveyed toward one or more picking stations 145 by the main conveyor 130 to identify two adjacent containers (e.g., FIG. 1, containers 120k and 120m) that are eligible for the product merging therebetween. In certain aspects, the business rules governing the product merging between the containers 120f-120q moving on the conveying system 130 includes at least one of: a total number of the products 190 located within the containers 120a-120q conveyed by the conveying system 130; size dimensions of each of the products 190 located within the containers 120a-120q conveyed by the conveying system 130; a total weight of each of the products 190 located within the containers 120a-120q conveyed by the conveying system 130; pending customer orders associated with the products 190 located within the containers 120a-120q conveyed by the conveying system 130; categories of similar products that may be stored together in a container/tote and categories of dissimilar products that should not be stored in a container/tote together (i.e., one of the decision points for the control circuit 210 is to identify similar products 190 that may be stored together within a container/tote) a total number of product transfers required to merge the products 190 stored in the first one of the two adjacent containers (e.g., 120k) with the products 190 stored in the second one of the two adjacent containers (e.g., 120m); and a total workload (e.g., total number of product pick operations, product merging operations, etc.) assigned to each one of the picking stations 145.

In the embodiment shown in FIG. 1, the electronic inventory management device 150 is coupled to and obtains the above-described business rules from an inventory management database 170 (also referred to herein simply as "the electronic database 170"). The electronic inventory management device 150 and the electronic inventory management database 170 may be implemented as a single device or may be implemented as two separate devices as illustrated in FIG. 1, and may be located at the same location/facility or at different locations/facilities. The electronic database 170 may be stored, for example, on non-volatile storage media (e.g., a hard drive, flash drive, or removable optical disk) internal or external to the electronic inventory management device 150, or internal or external to computing devices separate and distinct from the electronic inventory management device 150. In some embodiments, the electronic inventory management database 170 may be cloud-based.

In some embodiments, the exemplary electronic inventory management database 170 of FIG. 1 is configured to store electronic data associated with the products 190 stored in the containers 120a-120q stored and or transported by the automated storage and retrieval system 100. In certain aspects, the electronic inventory management database 170 may store electronic data indicating one or more of: an identifier and physical location of each of the containers 120a-120q, identifiers of each of the products 190 stored in each of the containers 120a-120q; estimated container/tote utilization value (which may be expressed, for example, as a percentage representing the occupied and/or available storage space for products 190 inside of each of the containers 120a-120q at a given time; association between the products 190 located within the containers 120a-120q that are associated with product orders placed by one or more customers of the retailer (and an indication of the number of units of each product 190 associated with each of the product orders); names and addresses of the customers of the retailer who ordered the products 190 for delivery/pickup. In one aspect, the electronic data representing the available storage space within each of the containers 120a-120q may be in the form of a grid-like map or planogram. In some aspects, the electronic inventory management database 170 is configured to facilitate real-time tracking of the inventory of available storage space inside of the containers 120a-120q and for real-time tracking of the inventory of products 190 controlled by the automated storage and retrieval system 100.

Figure 3:
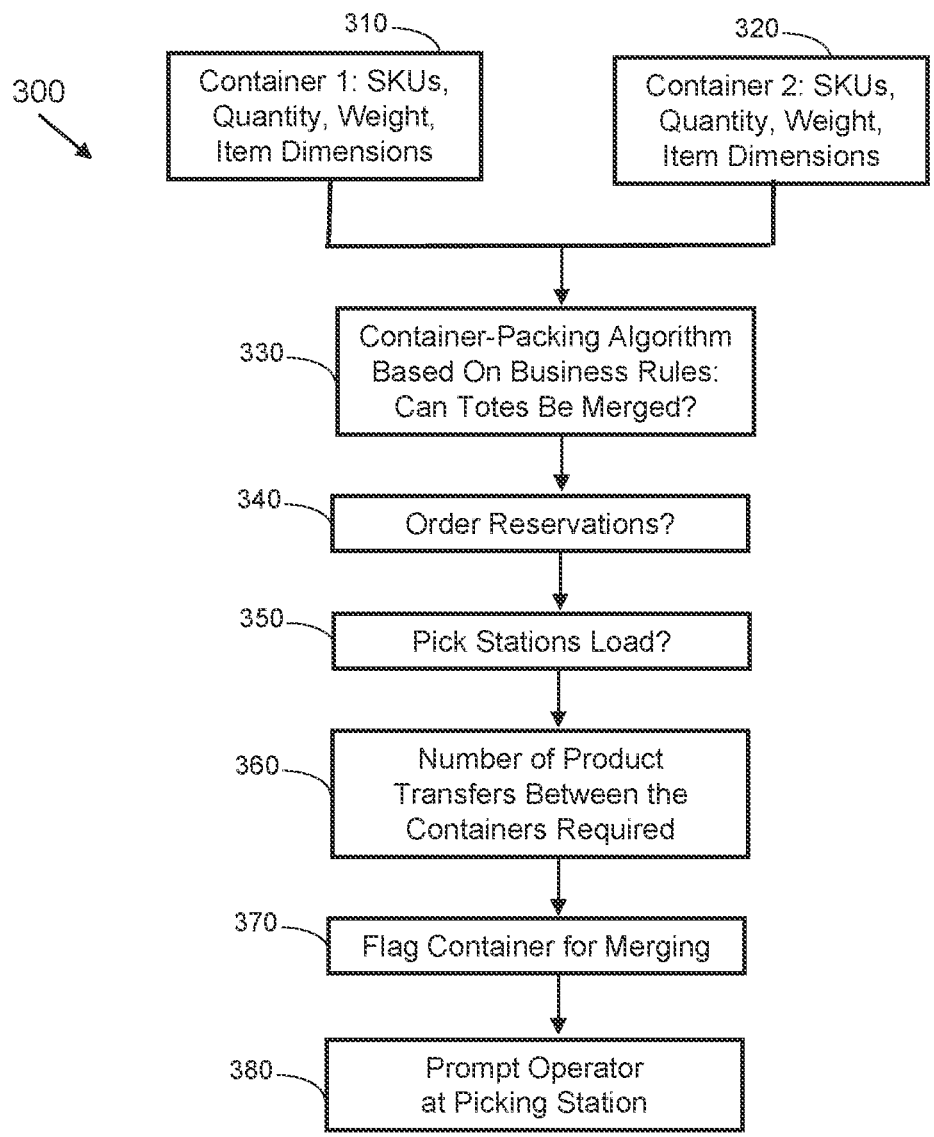
FIG. 3 is a flow chart diagram of a process of managing automated storage, retrieval, and merging of products at a product distribution facility in accordance with some embodiments.

An exemplary (so-called opportunistic) tote-merging analysis by the control circuit 210 of the electronic inventory management device 150 is represented by a flow chart-organized process 300 shown in FIG. 3. In some embodiments, as the containers 120f-120m move on the conveyor 130 toward the picking station 145, the control circuit 210 is programmed to obtain data from the electronic inventory management database 170 and analyze the obtained data to determine which pair of the containers 120f-120m is eligible for product merging based on the applicable business rules preprogrammed into the control circuit 210. For example, in the exemplary process 300 shown in FIG. 3, the control circuit 210 analyzes pairs of adjacent (i.e., consecutively traveling) containers traveling on the product advancement surface 132 of the main conveyor 130 to determine the total number of different stock keeping units (SKUs) located in each of the containers 120f-120m, the total quantity of products 190 stored in each of the containers 120f-120m, the dimensions of each of the products 190 stored in each of the containers 120f-120m, the weight of each of the products 190 stored in each of the containers 120f-120m, and the overall dimensions (e.g., length, width, height) of each of the containers 120f-120m (steps 310,320).

Upon analyzing the number and size of the products 190 stored in each of the containers 120f-120m (which have known dimensions stored in the electronic inventory management database 170), the control circuit 210 is programmed to apply one or more business rules that govern tote merging between the containers 120f-120m in order to determine whether the products 190 between a pair of containers (e.g., 120k, 120m in FIG. 1) can be merged to improve the space utilization between this pair of the containers (step 330). For example, based on an analysis of the number and size of the products 190 stored in each of the containers 120k and 120m (see FIG. 1), the control circuit 210 in step 330 may determine that each of the containers 120k, 120m currently stores two products 190, and that the products 190 stored in the containers 120k, 120m are identical in size, and that each of the containers 120k, 120m has a storage capacity for four products 190 (i.e., each of the containers 120k, 120m is at 50% space utilization). Such a determination may generally cause the control circuit 210 to flag the containers 120k, 120m for product merging therebetween, such that two of the products from one of the containers (e.g., 120k) are merged with the products 190 stored in the other one of the containers (i.e., 120m). However, in embodiment illustrated in FIG. 3, to account for the possibility that one or more of the products 190 may be moving on the conveyor 130 within their respective container 120k, 120m toward the picking station 145 because they are reserved/marked to be picked at the picking station 145 to fulfill an existing customer order, the control circuit 210 is programmed to obtain order information from the electronic database 170 to determine whether any of the products 190 stored in the containers 120k, 120m are associated with existing customer orders and/or marked for order fulfillment-related picking from the containers 120k, 120m at the picking station 145 (step 340).

In the exemplary process 300 shown in FIG. 3, after determining that two adjacent containers 120k, 120m traveling on the conveyor 130 are eligible for product merging, the control circuit 210 also analyzes a workload (i.e., number of product picks from the containers, number of product transfers/merges between the containers, etc.) at the picking station 145 to determine whether the picking station 145 has the workload capacity to perform the product merging operation between the product merging-marked containers 120k, 120m (step 350). To that end, the control circuit 210 also determines the workload that would be imposed onto the picking station 145 by the product merging operation between the containers 120k, 120m by determining the number of product picks and product transfers required to be performed by the operator 185 or the robotic arm 147 to fully complete the product merging between the containers 120k and 120m (step 360).

In the illustrated embodiment, if the control circuit determines, based on steps 310-360 that the product merging operation satisfies the applicable business rules and should proceed at the picking station 145, the control circuit 210 flags/marks the containers 120k, 120m for merging, for example, by transmitting data to the electronic database 170 to identify the containers 120k, 120m as the next container pair to be merged (step 370). In addition, if the control circuit determines, based on steps 310-360 that the product merging operation satisfies the applicable business rules and should proceed at the picking station 145, the control circuit 210 transmits a signal to the display 148 at the picking station 145 to notify the operator 185 that containers 120k, 120m are to be merged when they arrive at the picking station 145, and to indicate to the operator 185 which of the containers 120k, 120m is to be emptied out and which of the containers (e.g., 120m) is to be filled up with the products 190 removed from the other container 120k (step 380).

In some embodiments, upon analyzing the number and size of the products 190 stored in each of the containers 120f-120m (which have known dimensions stored in the electronic inventory management database 170), the control circuit 210 is programmed to apply one or more business rules that govern tote merging between the containers 120f-120m in order to determine whether the products 190 between a pair of containers (e.g., 120k, 120m in FIG. 1) can be merged to improve the space utilization between this pair of the containers (step 330). For example, based on an analysis of the number and size of the products 190 stored in each of the containers 120k and 120m (see FIG. 1), the control circuit 210 in step 330 may determine that each of the containers 120k, 120m currently stores two products 190, and that the products 190 stored in the containers 120k, 120m are identical in size, and that each of the containers 120k, 120m has a storage capacity for four products 190 (i.e., each of the containers 120k, 120m is at 50% space utilization). Such a determination may generally cause the control circuit 210 to flag the containers 120k, 120m for product merging therebetween, such that two of the products from one of the containers (e.g., 120k) are merged with the products 190 stored in the other one of the containers (i.e., 120m). However, in embodiment illustrated in FIG. 3, to account for the possibility that one or more of the products 190 may be moving on the conveyor 130 within their respective container 120k, 120m toward the picking station 145 because they are reserved/marked to be picked at the picking station 145 to fulfill an existing customer order, the control circuit 210 is programmed to obtain order information from the electronic database 170 to determine whether any of the products 190 stored in the containers 120k, 120m are associated with existing customer orders and/or marked for order fulfillment-related picking from the containers 120k, 120m at the picking station 145 (step 340).

In certain implementations, after the control circuit 210 of the electronic inventory management device 150 analyzes the above-described business rules governing product merging between the containers 120f-120n being conveyed toward one or more picking stations 145 by the main conveyor 130, when the control circuit 210 detects (e.g., by receiving a signal from one or more sensors 149 located at the one or more picking stations 145) that two adjacent containers (e.g., 120k and 1200m) identified as being eligible for the product merging arrived at the picking station 145, the control circuit 210 transmits a first signal to the control unit 160 to cause the conveying system 130 to keep the two adjacent containers 120k, 120m that are eligible for the product merging at the picking station 145 for a period of time that is sufficient to permit the operator 185 or the robotic arm 147 to remove all of the products 190 stored in one of the two adjacent containers (e.g., 120k) and place the removed products 190 into the other one of the two adjacent containers (i.e., 120m) to be merged with the products 190 stored in the container 120m.

In the embodiment shown in FIG. 1, the conveying system 130 includes a transfer conveyor 135. In some implementations, the transfer conveyor 135 is configured for movement in a direction perpendicular to at least one product advancement surface 132 of the main conveyor 130. It will be appreciated that the transfer conveyor 135 may be oriented in a direction that is not perpendicular (e.g., at a 30 degree angle, 45 degree angle, 60 degree angle, etc.) relative to product advancement surface 132.

In some embodiments, when the containers (e.g., 120k, 120m) that have been identified by the control circuit 210 based on the above-described analysis as being eligible for the product merging arrive on the product advancement surface 132 of the main conveyor 130 at the picking station 145, one of the sensors 149 located at the picking station 145 sends a signal via the network 155 to the electronic inventory management device 150 to indicate that the sensor 149 detected the arrival of the containers 120k, 120m at the picking station. In one aspect, each of the containers moving on the conveyor 130 includes an identifier (e.g., bar code, RFID, etc.) configured to be scanned and recognized by one or more of the sensors 149.

In one embodiment, in response to receiving a signal from the sensor 149 indicating that the containers 120k, 120m marked/flagged by the control circuit 210 for product merging based on the above-discussed analysis arrived at the picking station 145, the control circuit 210 of the electronic inventory management device 150 sends a signal to the control unit 160 to activate the movement of the transfer conveyor 135 such that the containers 120k, 120m are transferred from the product advancement surface 132 of the conveyor 130 into the product picking area of the picking station 145, where the operator 185 (or the robotic arm 147) may pick one or more products 190 from one or more of the containers 120k, 120m, depending on the instructions sent by the control circuit 210 (which may be displayed to the operator 185 on the display 148). In another embodiment, in response to receiving a signal from the sensor 149 indicating that the containers 120k, 120m marked/flagged by the control circuit 210 for product merging arrived at the picking station 145, instead of sending a signal to the control unit 160 to activate the transfer conveyor 135, the control circuit 210 of the electronic inventory management device 150 sends a signal to the control unit 160 to activate the movement of the robotic arm 147 to grasp and transfer the containers 120k, 120m from the product advancement surface 132 of the conveyor 130 into the product picking area of the picking station 145.

Notably, it is not necessary for the containers 120k, 120m flagged for product merging therebetween to be moved off (e.g., by the operator 185 or the robotic arm 147) the product advancement surface 132 of the conveyor 130 when the containers 120, 120m are detected by one or more sensors 149 as having arrived at the picking station 145. In some embodiments, in response to receiving a signal from the sensor 149 indicating that the containers 120k, 120m flagged by the control circuit 210 for product merging based on the above-discussed analysis arrived at the picking station 145, the control circuit 210 of the electronic inventory management device 150 sends a signal to the control unit 160 to stop the movement of the main conveyor 130 such that the containers 120k, 120m are stopped at the picking station 145, but remain on the product advancement surface 132 of the conveyor 130, such that the operator 185 (or the robotic arm 147) may pick one or more products 190 from one or more of the containers 120k, 120m while the containers 120k, 120m are positioned on the product advancement surface 132.

In one embodiment, in response to receiving a signal from the sensor 149 indicating that the containers 120k, 120m marked/flagged by the control circuit 210 for product merging based on the above-discussed analysis arrived at the picking station 145, the control circuit 210 of the electronic inventory management device 150 sends a signal to the control unit 160 to activate the movement of the transfer conveyor 135 such that the containers 120k, 120m are transferred from the product advancement surface 132 of the conveyor 130 into the product picking area of the picking station 145, where the operator 185 (or the robotic arm 147) may pick one or more products 190 from one or more of the containers 120k, 120m, depending on the instructions sent by the control circuit 210 (which may be displayed to the operator 185 on the display 148).

In some embodiments, after all of the products 190 are picked from the first one of the containers (e.g., 120k) located at the picking station 145 and transferred into the second one of the containers (i.e., 120m) located at the at least one picking station, the transfer conveyor 135 is activated (e.g., via a signal sent by the control circuit 210 to the control unit 160) to convey the (now empty) first container 120k from the picking station 145 (directly, or partially via the product advancement surface 132 of the main conveyor 130) to an empty container filling station or disposal station. In one aspect, if the merging of the products 190 from the container 120k into the container 120m causes the container 120m to be completely full (i.e., achieve a 100% space utilization), the main conveyor 130 is activated (e.g., via a signal sent by the control circuit 210 to the control unit 160) to convey the (now full) second container 120m from the picking station 145 via the transfer conveyor 135 and the product advancement surface 132 of the main conveyor 130 to the storage structure 110 to be stored at one of the product storage locations 112a-112e.

In another aspect, if the merging of the products 190 from the container 120*k* into the container 120*m* causes the container 120*m* to be less than completely full (e.g., achieve a 66% space utilization), after the now empty container 120*k* is moved from the picking station 145 (via the transfer conveyor 135 and/or the main conveyor 130) to an empty container filling station or disposal station, the control circuit 210 is programmed to analyze the containers (e.g., 120*j*, 120*q*, 120*p*, 120*i*, 120*h*, 120*g*, 120*f*) remaining/moving on the product advancement surface 132 of the conveyor 130 in view of the above-described business rules governing the product merging between the containers to possibly identify another (i.e., a third) container that is eligible to participate in the product merging process with the container 120*m* that remains at the picking station 145.

For example, if the control circuit 210 analyzes both the space utilization value of the container 120*m* and the number of products 190 stored in each of the containers moving on the conveyor 130 in view of the applicable product merging business rules, and determines that container 120*q* is eligible for product merging with the container 120*m* that remains at the picking station 145 because the number of products 190 stored in the container 120*q*, if merged with the products 190 stored in the container 120, would fill the container 120*m* to a 100% space utilization, the control circuit 210 may transmit a third signal to the control unit 160 to activate the main conveyor 130 to convey the third container 120*q* to the picking station 145 for the product merging with the second container 120*m* that remains at the picking station 145 after the first (emptied) container 120*k* has been moved out from the pickings station 145. In some embodiments, after the determination by the control circuit 210 that the second container 120*m* has been filled with the products 190 such that the second container 120*m* is no longer eligible for the product merging with another one of the conveyors being conveyed on the main conveyor 130 (either because the container 120*m* is at 100% space utilization, or because the other containers are otherwise incompatible for product merging with the container 120*m*), the control circuit 210 is programmed to transmit a signal to the control unit 160 to activate the transfer conveyor 135 and/or the main conveyor 130 to convey the optimally filled second container 120*m* from the picking station 145 to the storage structure 110 to open up space at the picking station 145 for another adjacent container pair that has been identified (based on the above-described business rules) by the control circuit 210 as being eligible for product merging therebetween.

Figure 4:
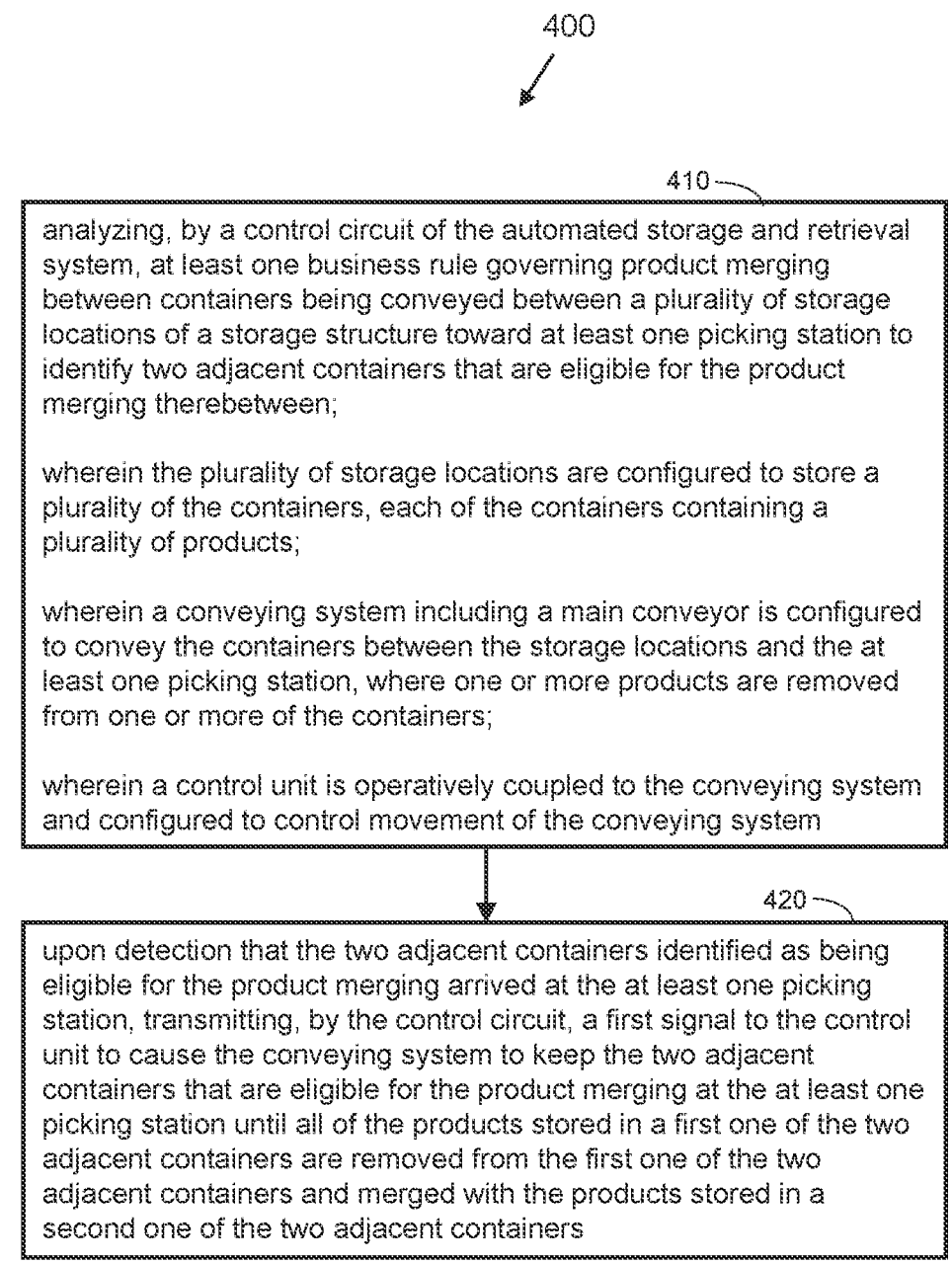
FIG. 4 is a flow diagram of a method of managing automated storage, retrieval, and merging of products at a product distribution facility in accordance with some embodiments.

FIG. 4 shows an embodiment of an exemplary method 400 of using an automated storage and retrieval system 100 for managing storage of inventory at a retail facility. With reference to FIGS. 1 and 4, the exemplary method 400 includes analyzing, by a control circuit 210 of the electronic inventory management device 150 of the automated storage and retrieval system 100, one or more business rules governing product merging between the containers 120*a*-120*q* being conveyed between the storage locations 112*a*-112*e* of a storage structure 110 toward one or more product picking stations 145 to identify two adjacent containers (e.g., 120*k*, 120*m*) traveling on the conveyor 130 that are eligible for product merging therebetween (step 410).

As mentioned above, the storage locations 112*a*-112*e* of the storage structure 110 can store one or more of the containers 120*a*-120*q* thereon. Notably, the containers 120*a*-120*q* may be transferred from the storage locations 112*a*-112*e* onto the conveyor 130 and from the conveyor 130 onto the storage locations 112*a*-112*e* by a human operator or by a robotic arm 115, as depicted in FIG. 1. Notably, as described above, the conveying system of the exemplary automated storage and retrieval system 100 includes a main conveyor 130 configured to convey the containers 120*a*-120*q* between the storage locations 112*a*-112*e* of the storage structure 110 and the picking station 145, where the products 190 are removed (for order fulfillment or for container merging) from one or more of the containers 120*a*-120*q*. As described above, in some embodiments, a control unit 160 is operatively coupled to the main conveyor 130 (and/or the transfer conveyor 135) of the conveying system, and this control unit 160 is configured to control the movement of the main conveyor 130 (and/or the transfer conveyor 135), for example, in response to receiving control signals from the control circuit 210 of the electronic inventory management device 150.

With reference to FIG. 4, after the control circuit 210 determines two adjacent containers (e.g., 120*k*, 120*m*) that are eligible for product merging therebetween, and after the control circuit 210 detects (e.g., by receiving a signal from a sensor 149) that the two adjacent containers 120*k*, 120*m* identified as being eligible for the product merging arrived at the picking station 145, the exemplary method 400 further includes transmitting, by the control circuit 210, a first signal to the control unit 160 of the conveying system to cause the conveying system to keep the two adjacent containers 120*k*, 120*m* that are eligible for the product merging at the picking station 145 until all of the products 190 stored in a first one of the two adjacent containers 120*k* are removed from the container 120*k* and merged with the products 190 stored in the second one of the two adjacent containers 120*m* (step 420).

As noted above, the containers 120*k*, 120*m* flagged for product merging by the control circuit 210 may be transferred from the product advancement surface 132 of the main conveyor 130 into a product picking area of the picking station 145 via a transfer conveyor 135, or via a robotic arm 147 positioned at the picking station 145. Then, after the merging operation is complete as indicated by one or more sensors 149 (which detect every pick and transfer of the products 190 between the containers 120*k*, 120*m*), the control circuit 210 of the electronic inventory management device is programmed to cause the conveying system to move the emptied out container 120*k* to an empty container filling or disposal area, and to move the fully filled up container 120*m* to the storage structure 110 to be stored at one of the storage locations 112*a*-112*e*. As pointed out above, in some implementations, if the control circuit 210 determines that the container 120*m* is not fully filled up with the products 190 after the product merging operation, and that another (i.e., third) container traveling on the main conveyor 130, if emptied of products 190, would fully fill up the container 120*m*, the control circuit 210 is programmed to cause the conveyor 130 to move this third conveyor into the empty space at the picking station 145 left by the moved out container 120*k*, and to send a signal to cause the robotic arm 147 to perform the product merging between the container 120*m* and the third container, or to send a signal to the display 148 to instruct the operator 185 to perform the product merging between the container 120*m* and the third container.

The systems and methods described herein advantageously allow retail facilities to automatically merge products between storage containers to optimize storage space utilization of the storage containers without requiring the workers to visually inspect the storage containers and to manually determine which containers to merge and how many products can be transferred from one container to another. The systems and methods describe herein thus provide significant operation efficiency and operation cost reduction for the retailers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An automated storage and retrieval system for managing storage of inventory at a retail facility, the system comprising:
  a storage structure including a plurality of storage locations configured to store a plurality of containers, each of the containers containing a plurality of products;
  a container transport system including at least one conveyor configured to transport the containers between the storage locations and at least one picking station, where one or more products are removed from one or more of the containers;
  a control unit operatively coupled to the container transport system and configured to control movement of the at least one conveyor of the container transport system; and
  a control circuit communicatively coupled to the control unit, the control circuit being configured to:
    analyze at least one business rule governing product merging between the containers being transported toward the at least one picking station by the container transport system to identify two adjacent containers that are eligible for the product merging therebetween; and
    in response to receipt of a signal from at least one sensor positioned adjacent the at least one picking station, the signal indicating that the at least one sensor detected that the two adjacent containers identified as being eligible for the product merging arrived at the at least one picking station, transmit a first signal to the control unit to cause the control unit to stop movement of the at least one conveyor of the container transport system to keep the two adjacent containers that are eligible for the product merging at the at least one picking station until all of the products stored in a first one of the two adjacent containers are removed from the first one of the two adjacent containers and merged with the products stored in a second one of the two adjacent containers.

2. The system of claim 1, wherein the at least one business rule governing the product merging between the containers being moved by the container transport system includes at least one of: a total number of the products located within the containers being moved by the container transport system; size dimensions of each of the products located within the containers being moved by the container transport system; a total weight of each of the products located within the containers being moved by the container transport system; pending customer orders associated with the products located within the containers being moved by the container transport system; a total number of product transfers required to merge the products stored in the first one of the two adjacent containers with the products stored in the second one of the two adjacent containers; and a total workload assigned to the at least one picking station.

3. The system of claim 1, wherein the control circuit is further configured, upon an identification by the control circuit of the two adjacent containers that are eligible for the product merging, to transmit a second signal to a computing device including a display to cause the computing device to show on the display a notification to a worker at the at least one picking station, the notification identifying the two adjacent containers eligible for the product merging and indicating which of the two adjacent containers is to be emptied, and which of the two adjacent containers is to be filled with the products removed from a container that is emptied.

4. The system of claim 1, wherein the container transport system includes at least one sensor configured to detect a number of the products picked from the first one of the two adjacent containers at the at least one picking station and transferred into the second one of the two adjacent containers at the at least one picking station.

5. The system of claim 4, wherein the at least one conveyor of the container transport system further includes:
  a main conveyor configured to convey the containers between the storage locations and the at least one picking station; and
  a transfer conveyor configured, after all of the products are picked from the first one of the containers at the at least one picking station and transferred into the second one of the containers at the at least one picking station, to convey the first one of the containers from the at least one picking station to an empty container filling or disposal station.

6. The system of claim 5, wherein, after the control circuit receives data from the at least one sensor and determines that the data received from the at least one sensor indicates that all of the products have been picked from the first one of the two adjacent containers and transferred into the second one of the two adjacent containers at the at least one picking station, the control circuit is configured to transmit a second signal to the control unit of the container transport system to activate the transfer conveyor to convey the first one of the two adjacent containers from the at least one picking station to the empty container filling or disposal station while the second one of the containers remains at the at least one picking station.

7. The system of claim 6, wherein the control circuit is configured to analyze the at least one business rule governing the product merging between the containers moving on the container transport system to identify a third one of the containers that is eligible for the product merging with the second one of the containers that remains at the at least one picking station after the products stored in the first one of the containers were merged with the products stored in the second one of the containers.

8. The system of claim 7, wherein the control circuit is configured, upon an identification by the control circuit of the third one of the containers that is eligible for the product merging with the second one of the containers that remains at the at least one picking station, to transmit a third signal to the control unit to activate the main conveyor of the container transport system to convey the third one of the containers to the at least one picking station for the product merging with the second one of the containers that remains at the at least one picking station.

9. The system of claim 8, wherein the control circuit is configured, upon a determination by the control circuit that the second one of the containers has been filled with the products such that the second one of the containers is no longer eligible for the product merging with another one of the containers being conveyed by the container transport system, to transmit a fourth signal to the control unit to activate the main conveyor of the container transport system to convey the second one of the containers from the at least one picking station to open up space at the at least one picking station.

10. The system of claim 1, wherein:
the at least one picking station includes at least one robotic arm and the control unit of the container transport system is configured to control the at least one robotic arm to remove the products from the first one of the two adjacent containers and to place the products removed from the first one of the two adjacent containers into the second one of the two adjacent containers; and
the control circuit is configured to transmit a second signal to the control unit of the container transport system to control movement of the at least one robotic arm.

11. A method of using an automated storage and retrieval system for managing storage of inventory at a retail facility, the method comprising:
analyzing, by a control circuit of the automated storage and retrieval system, at least one business rule governing product merging between containers being transported between a plurality of storage locations of a storage structure toward at least one picking station to identify two adjacent containers that are eligible for the product merging therebetween;
wherein the plurality of storage locations are configured to store a plurality of the containers, each of the containers containing a plurality of products;
wherein a container transport system includes at least one conveyor configured to convey the containers between the storage locations and the at least one picking station, where one or more products are removed from one or more of the containers; and
wherein a control unit is operatively coupled to the container transport system and configured to control movement of the at least one conveyor of the container transport system; and
in response to receipt of a signal from at least one sensor positioned adjacent the at least one picking station, the signal indicating that the at least one sensor detected that the two adjacent containers identified as being eligible for the product merging arrived at the at least one picking station, transmitting, by the control circuit, a first signal to the control unit to cause the control unit to stop movement of the at least one conveyor of the container transport system to keep the two adjacent containers that are eligible for the product merging at the at least one picking station until all of the products stored in a first one of the two adjacent containers are removed from the first one of the two adjacent containers and merged with the products stored in a second one of the two adjacent containers.

12. The method of claim 11, wherein the at least one business rule governing the product merging between the containers being moved by the container transport system includes at least one of: a total number of the products located within the containers being moved by the container transport system; size dimensions of each of the products located within the containers being moved by the container transport system; a total weight of each of the products located within the containers being moved by the container transport system; pending customer orders associated with the products located within the containers being moved by the container transport system; a total number of product transfers required to merge the products stored in the first one of the two adjacent containers with the products stored in the second one of the two adjacent containers; and a total workload assigned to the at least one picking station.

13. The method of claim 11, further comprising, upon the identification by the control circuit of the two adjacent containers that are eligible for the product merging, transmitting, by the control circuit, a second signal to a computing device including a display to cause the computing device to show on the display a notification to a worker at the at least one picking station, the notification identifying the two adjacent containers eligible for the product merging and indicating which of the two adjacent containers is to be emptied, and which of the two adjacent containers is to be filled with the products removed from a container that is emptied.

14. The method of claim 11, further comprising detecting, via at least one sensor at the at least one picking station, a number of the products picked from the first one of the two adjacent containers at the at least one picking station and transferred into the second one of the two adjacent containers at the at least one picking station.

15. The method of claim 14, wherein the at least one conveyor includes a main conveyor and a transfer conveyor and further comprising:
conveying the containers via the main conveyor of the container transport system between the storage locations and the at least one picking station; and
after all of the products are picked from the first one of the containers at the at least one picking station and transferred into the second one of the containers at the at least one picking station, conveying the first one of the containers via the transfer conveyor of the container transport system from the at least one picking station to an empty container filling or disposal station.

16. The method of claim 15, further comprising, after the control circuit receives data from the at least one sensor and determines that the data received from the at least one sensor indicates that all of the products have been picked from the first one of the two adjacent containers and transferred into the second one of the two adjacent containers at the at least one picking station, transmitting, by the control circuit, a second signal to the control unit of the container transport system to activate the transfer conveyor to convey the first one of the two adjacent containers from the at least one picking station to the empty container filling or disposal station while the second one of the containers remains at the at least one picking station.

17. The method of claim 16, further comprising analyzing, by the control circuit, the at least one business rule governing the product merging between the containers moving on the container transport system to identify a third one of the containers that is eligible for the product merging with the second one of the containers that remains at the at least one picking station after the products stored in the first one of the containers were merged with the products stored in the second one of the containers.

18. The method of claim 17, further comprising, upon an identification by the control circuit of the third one of the containers that is eligible for the product merging with the second one of the containers that remains at the at least one picking station, transmitting by the control circuit a third signal to the control unit to activate the main conveyor of the container transport system to convey the third one of the containers to the at least one picking station for the product merging with the second one of the containers that remains at the at least one picking station.

19. The method of claim 18, further comprising, upon a determination by the control circuit that the second one of the containers has been filled with the products such that the second one of the containers is no longer eligible for the product merging with another one of the containers being transported by the container transport system, transmitting by the control circuit a fourth signal to the control unit to activate the main conveyor of the container transport system to convey the second one of the containers from the at least one picking station to open up space at the at least one picking station.

20. The method of claim 11, further comprising:
controlling at least one robotic arm of the at least one picking station by the control unit of the container transport system to remove the products from the first one of the two adjacent containers and to place the products removed from the first one of the two adjacent containers into the second one of the two adjacent containers; and
transmitting a second signal from the control circuit to the control unit of the container transport system to control movement of the at least one robotic arm.

* * * * *